United States Patent [19]
Bennett

[11] Patent Number: 4,564,487
[45] Date of Patent: Jan. 14, 1986

[54] METHOD AND APPARATUS FOR MAKING A CONTINUOUS LENGTH OF TUBING HAVING FOAMED PLASTIC WALLS

[75] Inventor: Larry P. Bennett, Charlotte, N.C.

[73] Assignee: Lambda Corporation, Charlotte, N.C.

[21] Appl. No.: 533,501

[22] Filed: Sep. 19, 1983

[51] Int. Cl.⁴ ............................................. B29D 27/04
[52] U.S. Cl. .................................. 264/40.7; 264/45.8; 264/46.5; 264/46.9; 264/262; 425/135; 425/145; 425/151; 425/224; 425/817 C
[58] Field of Search ..................... 264/40.5, 40.6, 40.7, 264/271.1, 45.8, 46.5, 46.9, 262; 425/135, 145, 151, 224, 817 C

[56] References Cited
U.S. PATENT DOCUMENTS

| | | | |
|---|---|---|---|
| 3,754,064 | 8/1973 | Snelling | 264/40.5 |
| 3,816,043 | 6/1974 | Snelling | 425/4 C |
| 4,131,596 | 12/1976 | Allen | 264/40.5 |
| 4,137,025 | 1/1979 | Graves | 264/40.7 |
| 4,237,082 | 12/1980 | La Spisa | 264/40.7 |
| 4,405,398 | 9/1983 | Rother | 264/271.1 |

Primary Examiner—Philip Anderson
Attorney, Agent, or Firm—Shefte, Pinckney & Sawyer

[57] ABSTRACT

Method and apparatus for making a continuous length of tubing having an annular wall formed of polyurethane, including a forming cylinder having a mandrel extending centrally therethrough. Two strips of paper material are pulled through the forming cylinder, one surrounding the mandrel and one being disposed at the interior surface of the cylinder, and a curable plastic mixture is injected into the annular space between the paper strips. A sensor is provided to determine the point at which curing of the plastic mixture begins in the annular spacing within the cylinder, and the speed of travel of the paper through the cylinder is regulated as a function thereof. The control system shuts the apparatus down if a break in the paper strips is detected, or if the paper supply approaches exhaustion, or if the point of full curing is within a predetermined minimum spacing from the inlet end of the cylinder. Protrusions are provided at the outlet end of the cylinder to score the outer paper layer of the tubing, and the cylinder is mounted to frame for easy removal therefrom whereby cylinders of various sizes can be used.

23 Claims, 6 Drawing Figures

METHOD AND APPARATUS FOR MAKING A CONTINUOUS LENGTH OF TUBING HAVING FOAMED PLASTIC WALLS

BACKGROUND OF THE INVENTION

There are a variety of known types of tubing formed of insulating material which may be used in many applications where good insulation and similar properties are required. It has been found that tubing formed of foam plastic material such as polyurethane material is particularly effective as an insulating material.

It is known that continuous lengths of tubing of the aforesaid type may be formed by utilizing a forming mold constructed of upper and lower semi-cylindrical mold elements arranged on continuously movable conveyors so that the upper and lower mold elements come into contact with one another to form a moving cylindrical mold. A mandrel is disposed centrally of the cylindrical mold, and flexible strips of material are formed into cylinders which cover the exterior surface of the mandrel and the interior surface of the cylindrical mold. A liquid forming material is injected into the annular space between the strips of flexible material to be cured during its passage through the moving cylindrical mold, or during its passage through a curing oven if required. The method and apparatus for forming tubing of the aforesaid type are disclosed in greater detail in U.S. Pat. Nos. 3,745,621; 3,746,487; 3,754,064 and 3,816,043.

While tubing formed by this known process is commercially acceptable, it will be appreciated that the moving molding cylinder arrangement is complex in design and operation, and it is expensive to produce and run on a continuous basis. Additionally, it is somewhat difficult to assure proper curing of the plastic mixture during the time it is within the moving molding cylinder.

In accordance with the present invention, a method and apparatus for forming a continuous length of tubing having foamed plastic walls is provided which obviates the disadvantages of known technology, and which provides substantial general improvements to such technology.

SUMMARY OF THE INVENTION

The present invention provides a method and apparatus for making a continuous length of tubing with walls formed of a foamed material, including a forming cylinder having a mandrel extending centrally thereof along the length of the cylinder, first means for feeding or pulling a first strip of flexible material, preferably paper, into one end and through the forming cylinder, such first strip of flexible material being formed into a cylindrical shape about the mandrel, and second means for feeding or pulling a second strip of flexible material into one end of and through said forming cylinder, such second strip of flexible material being formed into a cylindrical shape at the interior surface of the forming cylinder. A curable foaming plastic mixture is injected into said one end of the forming cylinder and into the annular space between the first and second strips of flexible material, and a sensor is disposed at said one end of the forming cylinder for sensing the point along the length of the forming cylinder at which the foaming plastic mixture begins to cure into a solid across the cross-section of the annular space between said first and second strips of material. The signal from this sensor is utilized for selectively varying the speed at which the first and second strips of flexible material are fed through the forming cylinder. When the sensed point of curing is within a predetermined distance from said one end of the forming cylinder, the speed of the strips is increased, and such speed is decreased when the sensed point of curing is beyond such predetermined distance. By virtue of this control arrangement, proper curing of the foamed plastic material is obtained during the period of time that the foamed plastic material is passing through the forming cylinder. Additionally, this control arrangement may also incorporate a safety feature by which the entire tube forming process is shut down when the sensed point of curing is at a predetermined minimum spacing from said one end of the forming cylinder.

In accordance with further features of the present invention, the two strips of flexible material are fed into the forming cylinder from supply rolls, and additional sensing means are provided for detecting any break or rupture of the strips of material, and for monitoring the amount of flexible material contained on the supply rolls. If a break or rupture of either strip of material is detected, or if the reserve supply of flexible material on the supply rolls reaches a predetermined minimum, the control system of the present invention will shut down the tube forming process.

In accordance with a further feature of the present invention, the mandrel is formed as a hollow cylinder with the end thereof that is adjacent to said one end of the forming cylinder being opened, and with the other or extending end of the mandrel being closed. A length of tubing is mounted interiorly of the mandrel, such tubing having an open end adjacent the closed end of the mandrel, and a supply of cooling fluid, preferably air, is conveyed through the tubing so that it is introduced into the mandrel at the closed or extending end thereof, and flows back through the mandrel toward its opened end, thereby acting as a heat exchanger to cool the extending end of the mandrel while simultaneously heating the end of the mandrel adjacent said one end of the forming cylinder.

In accordance with another feature of the present invention, the extending or outlet end of the forming cylinder is provided with at least one, and preferably several, small protrusions at the interior surface of the forming cylinder, such protrusions serving to score the outer paper covering of the tubing as it leaves the forming cylinder, such scoring being utilized to accommodate in a neat fashion any subsequent shrinkage of the tubing after it leaves the forming cylinder, and to provide an indexing groove or guide which may be used during subsequent processing of the tubing.

Finally, the forming cylinder is mounted on a frame by mounting plates having cylindrical openings for receiving the forming cylinder, and these mounting plates are secured to the frame by detachable means which permits the plates to be quickly mounted on, or removed from, the frame, whereby forming cylinders of different diameters can be alternately used in the tube forming process by replacing one set of mounting plates having openings for receiving one size forming cylinder with mounting plates having larger or smaller openings for receiving a forming cylinder of a different size.

DESCRIPTION OF THE PREFERRED EMBODIMENT

Figure 1:
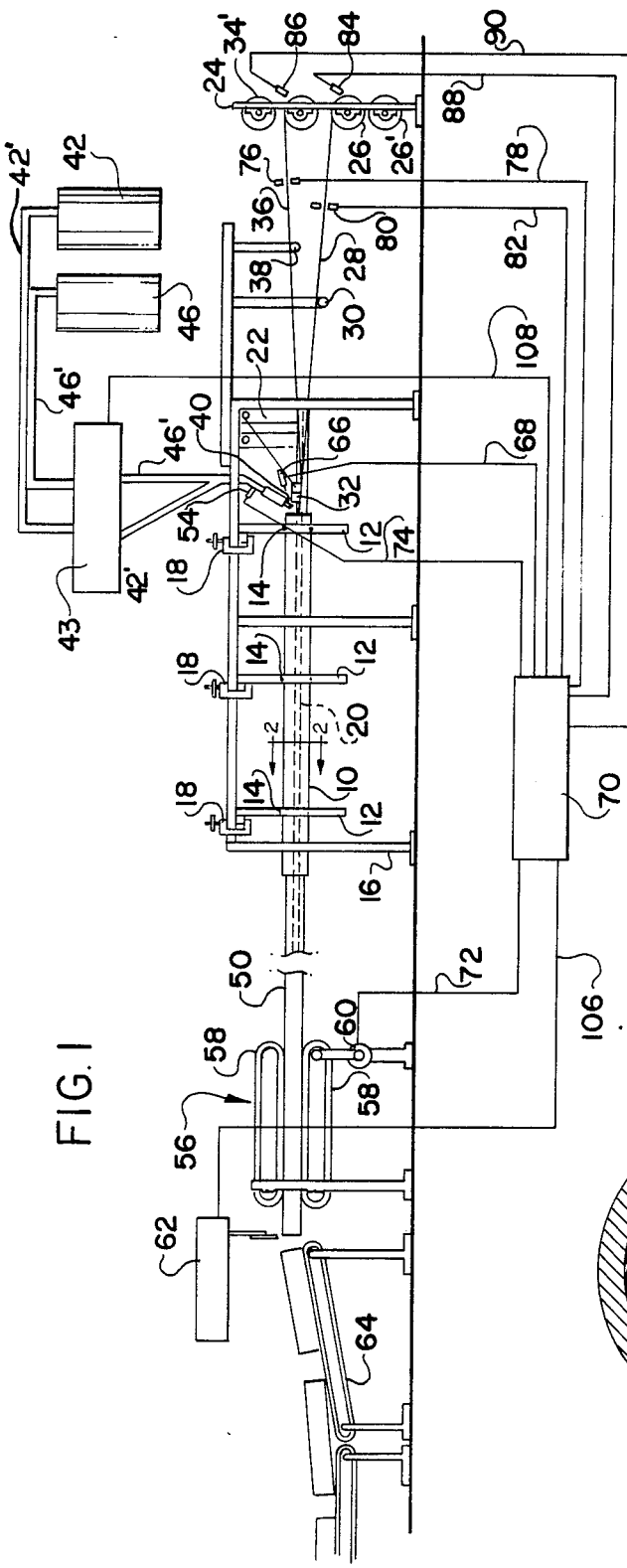
FIG. 1 is a diagrammatic illustration of apparatus for forming a continuous length of tubing in accordance with the present invention.

Looking now in greater detail at the accompanying drawings, FIG. 1 illustrates, in diagrammatic form, the preferred embodiment of the apparatus for carrying out the present invention, such apparatus including a cylindrical forming cylinder 10 which is mounted at a horizontal disposition by a plurality of mounting plates 12 which receive the forming cylinder 10 through cylindrical openings 14 having a diameter corresponding to the exterior diameter of the forming cylinder 10, and which are mounted to a frame 16 by quick-disconnect couplings 18 in the form of U-clamps having bolts for attaching and detaching the U-clamps 18 and the mounting plates 12 to the frame 16. It will be appreciated that if it is desired to use a forming cylinder 10 having a different diameter, such new forming cylinder 10 can be quickly mounted on the frame 16 by simply removing the mounting plates 12 and substituting new mounting plates having a smaller or larger opening 14 therein, and then sliding the new forming cylinder into the aligned openings of the mounting plates.

A mandrel 20 is also mounted on the frame 16 by depending support members 22 located adjacent to the inlet end of the forming cylinder 10, the mandrel 20 extending in cantilever fashion into and through the forming cylinder 10 so as to be disposed centrally thereof and in concentric relation to the forming cylinder 10.

Figure 3:
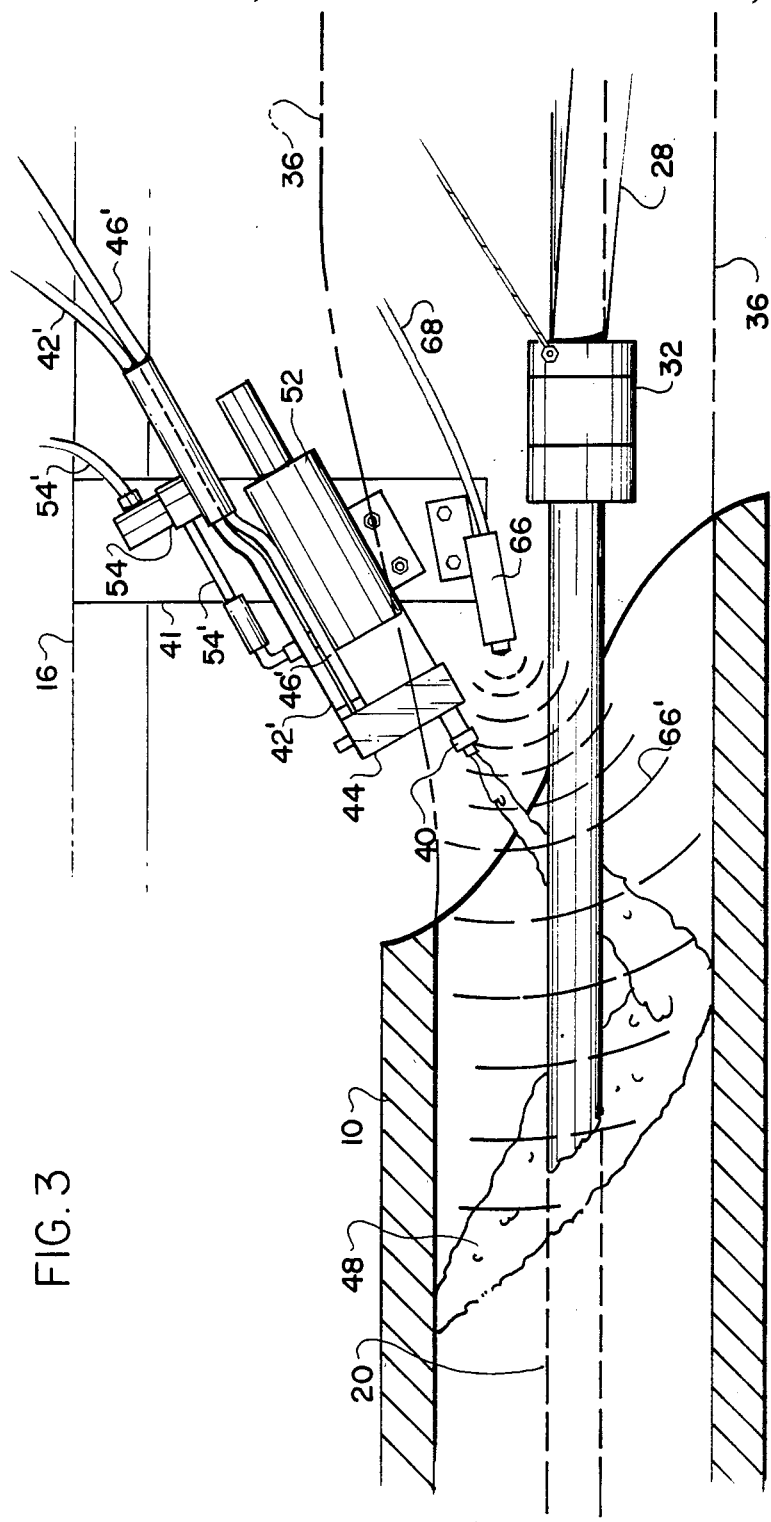
FIG. 3 is a detailed view in vertical section illustrating the inlet end of the forming cylinder.

A stanchion 24 is located in spaced relation to the inlet end of the forming cylinder 10, and a first supply roll 26 of a strip of flexible material 28 is mounted on the stanchion 24. This strip of flexible material 28, which is preferably paper, is fed from the supply roll 26 across a guide member 30 supported by the frame 16 and into the inlet end of the forming cylinder 10. As best seen in FIG. 3, the strip 28 passes through a shaping member 32 which forms the strip into a cylindrical shape that is disposed about the exterior surface of the mandrel 20. If desired, conventional equipment (not shown) can be provided for applying an adhesive to one edge of the strip prior to its being formed into a cylindrical shape so that such edge of the strip will adhere to the overlapping edge of the strip when it is formed into a cylindrical shape.

Figure 4:
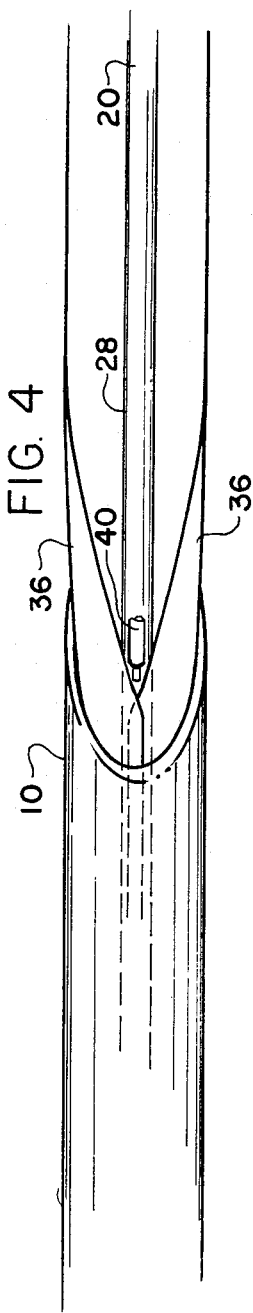
FIG. 4 is a plan view of the inlet end of the forming cylinder shown in FIG. 3, with some elements being omitted for purposes of clarity.

Similarly, the stanchion 24 includes a second supply roll 34 of a wider strip of flexible material 36, also preferably paper, which extends from the supply roll 34 over a guide member 38 attached to the frame 16, and into the inlet end of the forming cylinder 10. As best seen in FIGS. 3 and 4, the strip 36, as it enters the inlet end of the forming cylinder 10, is formed into a cylindrical shape and extends along the interior surface of the forming cylinder 10. Again, apparatus (not shown) may be provided for applying an adhesive to one edge of the strip 36 for the same purpose as that indicated above.

As best seen in FIGS. 3 and 4, the inlet end of the forming cylinder 10 is cut away in a plane disposed in angular relation to the center line of the forming cylinder 10 so that the strip 36 comes together in an overlapping "V" disposed above the bottom surface of the forming cylinder 10, and a plastic injecting nozzle 40 is mounted on a vertical support member 41 extending downwardly from the frame 16, with the tip of the nozzle 40 being disposed just within the "V" of the strip 36 and above the lower surface fo the forming cylinder 10 as best seen in FIG. 4.

Figure 2:
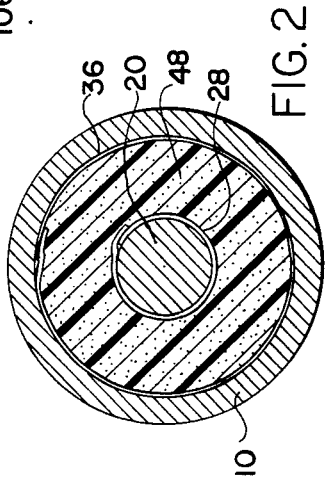
FIG. 2 is a detailed view taken along section line 2—2 in FIG. 1.

In the present invention, the foamed plastic material to be used is preferably polyurethane, and the nozzle 40 is of generally conventional construction for mixing and injecting a plastic mixture therefrom, as is well known in the art. Briefly, a first reservoir 42 is provided which contains a first ingredient consisting essentially of a plastic resin, isocyanate and a promoter combined as a liquid which is fed through a supply conduit 42' and a conventional metering device 43 to header 44 of the nozzle 40 having an internal passageway therein for receiving this first ingredient and directing it to the nozzle 40. A second reservoir 46 is provided which contains a second ingredient consisting essentially of a plastic resin and a catalyst combined as a liquid to be fed in a similar fashion to the nozzle 40 through supply conduit 46', metering device 43, and the header 44. The two ingredients are mixed as they flow from the internal passageways in the header 44 to the nozzle 40, and this mixing starts a chemical reaction which results in the plastic mixture ultimately expanding and foaming whereby a cellular structure 48 is formed as an annular wall of the tubing 50 as illustrated in FIG. 2, the cellular character being retained in solid form after the mixture has been cured. A pneumatically or hydraulically operated motor 52 is mounted on the header 44 for selectively opening and closing the internal passageways in the header 44 under the control of an electrically operated solenoid valve 54 which is disposed in the fluid line 54' extending to the motor 52. Electrically operating the solenoid valve 54 to one position thereof will result in the two ingredients being fed into the nozzle 40 and injected thereby, and electrically operating the solenoid valve 54 to its other position will result in the flow of both ingredients being stopped before they reach the nozzle 40 and become mixed.

Thus, in the present invention, the two ingredients for forming polyurethane are mixed in the nozzle 40 and immediately injected from the nozzle 40 into the annular spacing between the first and second cylindrical strips 28 and 36, as best seen in FIG. 3. The mixture which is injected by the nozzle 40 is essentially in liquid form, but the mixture immediately begins to cure as it leaves the nozzle 40 and in a relatively short period of time the mixture will be cured to an extent that it will form a solid extending across the entire cross-section of the annular spacing between the strips 28 and 36. As the foamed mixture continues to be moved along the length of the forming cylinder 10, final curing occurs so that, as shown in FIG. 2, a cellular structure 52 is formed between the cylindrically shaped strips 28 and 36, and the cellular structure 52 is completely cured by the time the tubing 54 leaves the outlet or extending end of the forming cylinder 10. It should be noted that since the plastic mixture sets up into a solid at a point near the inlet end of the forming cylinder and continues thereafter in a solid form, this solid form acts as a support for the cantilever-mounted mandrel 20, so that no additional support for the mandrel is necessary.

After the tubing leaves the outlet end of the forming cylinder 10, it enters the nip of a traction device 56 for pulling the tubing through the processing steps described above. The traction device 56 includes two vertically spaced traction belts 58 which are driven by an electric motor 60 so that the spaced, horizontally extending reaches of the two traction belts 58 move in a direction away from the forming cylinder 10, and the frictional engagement of the tubing 54 by the traction belts 58 will pull the tubing 54 horizontally through the forming cylinder 10. A conventional slitting device 62 is disposed at the exit end of the traction device 56 for cutting the tubing into pieces having any desired length, such pieces of tubing then being carried away by a conveyor system 64.

The basic operation of the apparatus described above is as follows. To commence the operation, the operator, using a pulling line or the like, manually pulls the two strips 28 and 36 through the forming cylinder 10, with the strips being formed in the cylindrical shapes described above. Preferably, the traction device 56 includes an external capstan (not shown) about which the pulling line can be wound to assist the operator in initially pulling the strips 28 and 36 through the cylinder 10. The nozzle 40 is then energized to inject the plastic mixture into the forming cylinder 10, and the operator continues to manually pull the paper strips at a linear speed approximating the linear speed at which the tubing is normally passed through the apparatus so that the plastic mixture is cured during its passage through the forming cylinder 10. When the tubing 54 has a sufficient length to reach the traction device 56, the tubing is inserted in the traction device 56 and the motor 60 therefor is energized. Thereafter, the traction device 56 will automatically and continuously pull the tubing 54, and the strips 28 and 36 which form a part thereof, through the forming cylinder 10 at a predetermined speed determined by the motor 60, so that a continuous length of tubing having foamed plastic walls is formed by the apparatus.

In looking at FIG. 3, it will be appreciated that the plastic mixture flowing from the nozzle 40 is deposited on the moving strips 28 and 36 and is carried along the length of the forming cylinder 10 thereby. Accordingly, the point along the length of the forming cylinder 10 at which the plastic mixture is initially cured as a solid across the entire cross-section of the annular spacing between the strips 28 and 36 is a function of the speed at which the strips 28 and 36 are pulled through the forming cylinder 10 by the traction device 56. More specifically, if the strips 28 and 36 are pulled through the forming cylinder at a relatively slow speed, the quantity of the plastic mixture being injected will accumulate more quickly with respect to the speed of the moving strips 28 and 36 and will set-up as a solid across the annular spacing at a point relatively close to the inlet end of the forming cylinder 10, whereas pulling the strips 28 and 36 at a relatively fast speed will result in such injected plastic mixture accumulating less quickly and the set-up point being spaced substantially further from the inlet end of the forming cylinder 10. After the plastic mixture initially sets-up, the chemical reaction between the ingredients continues to take place as the plastic is pulled through the forming cylinder 10, resulting in a continuing expansion or foaming of the plastic. It is important, in terms of the quality of the end product formed by the process of the present invention, that this chemical reaction or final curing take place while the plastic mixture is fully contained between the mandrel 20 and the forming cylinder 10. In accordance with one feature of the present invention, proper curing of the plastic material within the forming cylinder 10 is obtained by providing a sensor 66 mounted on the support 42 adjacent the inlet end of the forming cylinder 10 as shown in FIG. 3. This sensor 66 is a conventional ultrasound-type sensor which generates ultra-high-frequency sound waves, indicated by reference numeral 66', that are reflected back when they strike a solid surface and are detected by the sensor 66. Thus, the sensor 66 is able to sense the point along the length of the forming cylinder 10 at which the plastic mixture begins to cure into a solid that extends across the cross-section of the annular space between the cylindrical strips 28 and 36. The electrical signal generated by the sensor 66 is transmitted through electrical line 68 to a control panel 70, and a further electrical line 72 extends from the control panel to the variable speed motor 60 which operates the traction device 56. The control panel 70 is designed so that when the aforesaid sensed point of set-up of the plastic material is within a predetermined distance from the inlet end of the forming cylinder 10, the speed of the motor 60 is increased to thereby increase the speed at which the strips 28 and 36 are pulled through the forming cylinder 10 by the traction device 56 as described above. Similarly, if the sensed set-up point of the plastic material is beyond such predetermined distance from the inlet end of the forming cylinder 10, the speed of the motor 60 is decreased to slow the speed of the strips 28 and 36 through the forming cylinder 10. Thus, the sensor 66 is utilized to vary the speed of travel of the strips 28 and 36, which in turn varies the set-up point of the plastic mixture as described above so that this set-up point can be substantially maintained at a predetermined distance from the inlet end of the forming cylinder 10 which will provide proper curing of the plastic mixture while it is within the confines of the forming cylinder 10. Preferably, the control panel 70 is designed to proportionately increase or decrease the speed of the motor 60 as the sensed set-up point moves a greater distance away from the desired point of set-up along the length of the forming cylinder 10.

The control panel 70 is also preferably designed to include a safety feature by which the entire tube forming process is shut down if, for any reason, the sensed set-up point of the plastic mixture comes within a predetermined minimum spacing from the inlet end of the forming cylinder 10, thereby avoiding a very undesirable situation in which the liquid plastic mixture being injected from the nozzle 40 would flow out of the inlet end of the forming cylinder 10 and onto the floor or surrounding equipment. More particularly, the control panel 70 includes an electrical line 74 extending therefrom to the above-described solenoid valve 54 which controls the fluid motor 52. If the sensor 66 determines that the set-up point is within the aforesaid predetermined minimum spacing from the end of the forming cylinder 10, an electrical signal is transmitted through the line 74 to operate the solenoid valve 54 so that the further flow of the plastic ingredients to the nozzle 40 is stopped, and a signal is also transmitted through the line 70 to stop the motor 60 of the traction device 56, whereupon the operation of the entire system is shut down.

In accordance with a further feature of the present invention, a pair of photoelectric sensing devices 76 are disposed on each side of the strip of flexible material 28 as it is fed from the supply roll 26, and an electrical line 78 extends therefrom to the control panel 70. Corresponding sensing devices 80 are also disposed on each side of the strip 36, with an electrical line 82 extending therefrom to the control panel 70. If a break or rupture occurs in either of the strips 28 or 36, this break will be detected by the sensing devices 76 or 80 to transmit a signal to the control panel 70 which, in turn, will shut down the apparatus by operation of the solenoid valve 54 and stopping the motor 60 in the same manner as that described above.

Also, sensing devices 84 and 86 are disposed immediately adjacent the supply rolls 26 and 34, respectively, for sensing the diameters of such supply rolls, which is a function of the quantity of material which remains on the supply rolls at any given time. When either of the supply rolls 26 or 34 approaches exhaustion, this condition will be sensed by the sensing devices 84 or 86, and a signal will be transmitted therefrom through electrical lines 88 or 90, respectively, to the control panel 70, which will transmit electrical signals to the solenoid valve 54 and the motor 60 to shut down the apparatus and permit a fresh supply roll, such as the supply rolls 26' and 34' located on the stanchion 24, to be substituted for the exhausted supply rolls.

Figure 5:
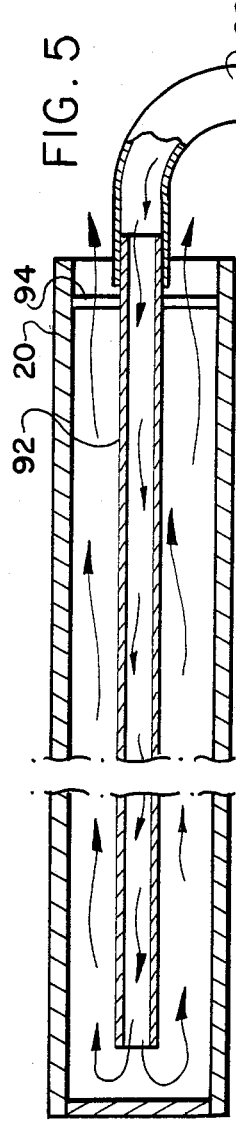
FIG. 5 is a detailed view, partly in section, illustrating the mandrel and cooling arrangement therefor.

Another feature of the present invention involves the distribution of the heat generated by the chemical reaction of the plastic mixture as it flows through the forming cylinder 10. This chemical reaction tends to generate progressively higher levels of heat as the plastic mixture approaches the outlet end of the forming cylinder 10, so that there is a significant inbalance in the heat that is transmitted to the enclosed mandrel at the inlet and outlet ends of the forming cylinder 10. To correct this inbalance, and distribute the heat more evenly along the length of the mandrel which lies within the length of the forming cylinder 10, the mandrel 20 is preferably formed as a cylinder as shown in FIG. 5, with the end of the mandrel 20 that is adjacent the inlet end of the forming cylinder 10 being open, and with the opposite or extending end of the mandrel being closed. A length of tubing 92 is disposed interiorly of the mandrel 20 by supporting spokes 94, and the extending end of the tubing 92 is open. A cooling fluid, preferably air, is conveyed from a source 96 through an inlet conduit 98 to the tubing 92, with the flow of cooling fluid being regulated by a valve 100. As shown in FIG. 5, this cooling fluid passes through the tubing 92 so as to be admitted into the mandrel 20 at the extending closed end thereof, and this air is therefore forced to flow back along the interior surface of the mandrel 20 for exhaustion at the open end of the mandrel 20, and this flow of fluid acts in the nature of a heat exchanger to transmit heat from the extending end of the mandrel 20 back to the open end of the mandrel 20, thereby assisting in equalizing the temperature of the mandrel 20 along the length thereof.

Figure 6:
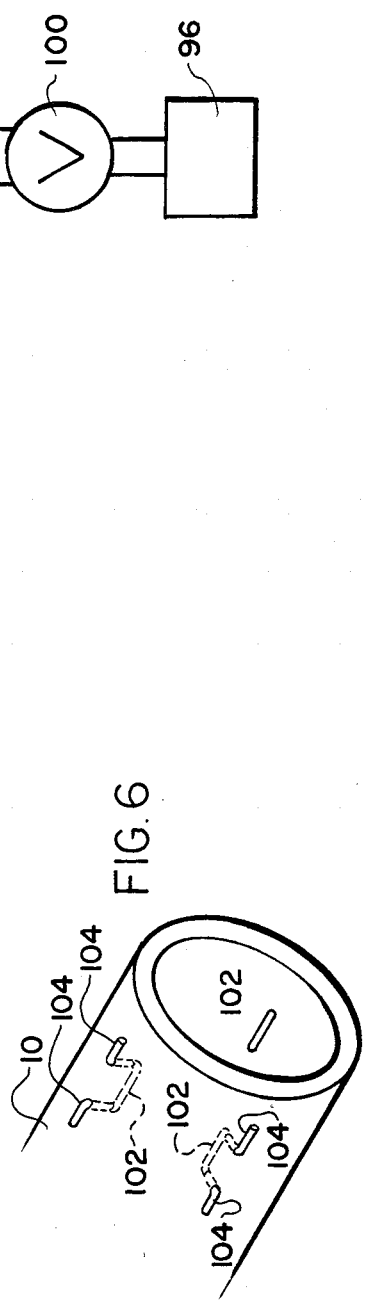
FIG. 6 is a detailed view showing the outlet or extending end of the forming cylinder.

It is a well known phenomenon that tubing formed of a foamed plastic material such as polyurethane will contract or shrink slightly after it is fully cured and cools to room temperature. While this contraction is not great, it will nevertheless tend to create an irregular crease in the outer paper layer formed by the strip 36. This irregular crease does not effect the structural integrity of the tubing, but it is somewhat unsightly, and it is sometimes mistakenly thought to represent a partial defect in the tubing. The drawbacks associated with this irregular crease are eliminated by a further feature of the present invention which, as best seen in FIG. 6, includes the mounting of small protrusions at the inner surface of the forming cylinder 10, adjacent the outlet end thereof. In the preferred embodiment of the present invention, these protrusions are in the form of small lengths of wire 102 having the ends 104 thereof passing outwardly through the forming cylinder 10 and being bent to hold the wire elements in place. While it may be suitable in some applications to use only one wire 102, it is generally preferable to provide a plurality of wires 102 which are equally spaced from one another in a radial direction as shown in FIG. 6. With this arrangement, when the formed tubing 50 passes through the extending or outlet end of the forming cylinder 10, the wires 102 will indent or score the outer paper layer 36 to form creases that extend along the length of the tubing 50. When the foamed plastic material subsequently shrinks or contracts as described above, this shrinkage will be accommodated in the outer paper layer 36 by the creases formed by the wires 102 without the formation of any additional, irregular creases in such paper. Moreover, these formed creases may be advantageously utilized as indexing grooves to properly orient and guide the tubing if it is passed through subsequent processing operations.

Finally, it will be noted that the control panel 70 can also be utilized to control the operation of the above-described slitting device 62 through an electrical line 106, and the above-described metering device 43 may be similarly controlled through an electrical line 108.

The present invention has been described in detail above for purposes of illustration only and is not intended to be limited by this description or otherwise to exclude any variation or eqivalent arrangement that would be apparent from, or reasonably suggested by the foregoing disclosure to the skill of the art.

I claim:

1. Apparatus for making a continuous length of tubing with walls formed of foamed material, said apparatus comprising:
   a. a forming cylinder having mandrel means extending centrally along the length of said cylinder;
   b. first means for feeding a first strip of flexible material into one end of and through said forming cylinder, and forming said first strip of material into a cylindrical shape about said mandrel;
   c. second means for feeding a second strip of flexible material into said one end of and through said forming cylinder, and forming said first strip of material into a cylindrical shape at the interior surface of said forming cylinder;
   d. means for injecting a curable foaming plastic mixture into said one end of said forming cylinder and into the annular space between said first and second strips of flexible material; and
   e. control means comprising a sensor means disposed adjacent said one end of said forming cylinder for sensing the point along the length of said forming cylinder at which said foaming plastic mixture begins to cure into a solid across the cross-section of said annular space between said strips of material, and regulating means responsive to said sensing means for selectively varying the speed at which said first and second strips of flexible material are fed through said forming cylinder.

2. Apparatus for making a continuous length of tubing as defined in claim 1 and further characterized in that said control means increases the speed at which said strips of flexible material are fed through said forming cylinder when said sensed point of curing is within a predetermined distance from said one end of said forming cylinder, and decreases the speed at which said strips of material are fed through said forming cylinder when said sensed point of curing is beyond said predetermined distance from said one end of said forming cylinder.

3. Apparatus for making a continuous length of tubing as defined in claim 2 and further characterized in that said speed of feeding is increased proportionally as said sensed point of curing approaches said one end of said forming cylinder, and in that said speed of feeding is decreased proportionally as said sensed point of curing moves away from said one end of said forming cylinder.

4. Apparatus for making a continuous length of tubing as defined in claim 1 and further characterized in that said control means stops the feeding of said first and second strips of material and stops the injection of said curable foaming plastic into said forming cylinder when said sensed point of curing is at a predetermined minimum spacing from said one of said forming cylinder.

5. Apparatus for making a continuous length of tubing as defined in claim 1 and further characterized in that said control means includes second sensing means for detecting a break in either of said strips of flexible material being fed into said forming cylinder, and in that said control means stops the further feeding of said strips of flexible material and the further injecting of said plastic mixture when a break in either of said strips of flexible material is detected.

6. Apparatus for making a continuous length of tubing as defined in claim 1 and further characterized in that said first and second strips of flexible material are fed to said forming cylinder from rolls which gradually decrease in diameter as said flexible material is fed therefrom, and in that said control means includes means for determining when said rolls reach a predetermined minimum diameter, and in that said control means stop the feeding of said strips of material and stops the injection of said plastic mixture when either of said rolls reaches said predetermined minimum diameter.

7. Apparatus for making a continuous length of tubing as defined in claim 1 and further characterized in that said mandrel includes means for causing a flow of cooling fluid therethrough in a direction from the extending end thereof toward said one end of said forming cylinder.

8. Apparatus for making a continuous length of tubing as defined in claim 7 and further characterized in that said mandrel is hollow with the end thereof nearest said one end of forming cylinder being open and with the extending end thereof being closed, in that a tube is disposed within said mandrel to extend along the length thereof with the extending end of said tube being open adjacent the closed end of said mandrel, and in that means is provided for causing a cooling fluid to flow through said tube and out through said open end thereof, whereby said cooling fluid is introduced into said mandrel adjacent said closed end thereof, flows along the length of said mandrel, and is discharged from said open end of said mandrel at said one end of said forming cylinder.

9. Apparatus for making a continuous length of tubing as defined in claim 1 and further characterized in that the other end of said forming cylinder is provided with at least one small protruding element projecting radially inwardly from the inner surface of said forming cylinder.

10. Apparatus for making a continuous length of tubing as defined in claim 1 and further characterized in that said forming cylinder is carried in a plurality of mounting plates having openings therein for receiving said forming cylinder, said mounting plates being secured to a support frame by detachable means, whereby alternate forming cylinders of different diametrical dimensions can be quickly mounted in said support frame.

11. Apparatus for making a continuous length of tubing as defined in claim 10 and further characterized in that said mandrel is mounted on said support frame at a location adjacent to said one end of said forming cylinder.

12. Apparatus for making a continuous length of tubing with walls formed of foamed material, said apparatus including:
   a. a forming cylinder having mandrel means extending centrally along the length of said cylinder;
   b. first means for feeding a first strip of flexible material into one end of and through said forming cylinder, and forming said first strip of material into a cylindrical shape about said mandrel;
   c. second means for feeding a second strip of flexible material into said one end of and through said forming cylinder, and forming said first strip of material into a cylindrical shape at the interior surface of said forming cylinder;
   d. means for injecting a curable foaming plastic mixture into said one end of said forming cylinder and into the annular space between said first and second strips of flexible materia; and
   e. control means for detecting a break in either of said strips of flexible material being fed into said forming cylinder and for stopping the further feeding of said strips of flexible material and stopping the further injecting of said plastic mixture when a break in either of said strips is detected.

13. Apparatus for making a continuous length of tubing with walls formed of foamed material, said apparatus comprising:
   a. a forming cylinder having mandrel means extending centrally thereof along the length of said cylinder;
   b. first means for feeding a first strip of flexible material from a wound supply roll into and through said forming cylinder and forming said first strip of material into a cylindrical shape about said mandrel;
   c. second means for feeding a second strip of flexible material from a wound supply roll into and through said forming cylinder, and forming said second strip of material into a cylindrical shape at the interior surface of said forming cylinder;
   d. means for injecting a curable foaming plastic mixture into said one end of said forming cylinder and into the annular space between said first and second strips of flexible material; and
   e. control means for detecting the amount of flexible material on said supply rolls of said first and second flexible material, and for stopping the further feeding of said first and second strips of flexible material and stopping the further injection of said plastic mixture when said amount of flexible material on either of said supply rolls reaches a predetermined minimum.

14. Apparatus for making a continuous length of tubing with walls formed of foamed material, said apparatus comprising:
   a. a forming cylinder having mandrel means extending centrally thereof along the length of said cylinder, said mandrel means being hollow and having its extended end closed and its other end open, and a tube extending into said mandrel through said open end thereof with its extending end being open adjacent said closed end of said mandrel, and means for causing a cooling fluid to flow through said tube and out through said open end of said tube, whereby said cooling fluid is introduced into said mandrel adjacent said closed end thereof, flows along the length of said mandrel, and is discharged from said open end of said mandrel;
   b. first means for feeding a first strip of flexible material into one end of and through said forming cylinder, and forming said first strip of material into a cylindrical shape about said mandrel;
   c. second means for feeding a second strip of flexible material into said one end of and through said forming cylinder, and forming said first strip of material into a cylindrical shape at the interior surface of said forming cylinder;
   d. means for injecting a curable foaming plastic mixture into said one end of said forming cylinder and into the annular space between said first and second strips of flexible material.

15. Apparatus for making a continuous length of tubing with walls formed of foamed material, said apparatus comprising:
   a. a forming cylinder having mandrel means extending centrally along the length of said cylinder;
   b. first means for feeding a first strip of flexible material into one end of and through said forming cylinder, and forming said first strip of material into a cylindrical shape about said mandrel;
   c. second means for feeding a second strip of flexible material into said one end of and through said forming cylinder, and forming said first strip of material into a cylindrical shape at the interior surface of said forming cylinder;
   d. means for injecting a curable foaming plastic mixture into said one end of said forming cylinder and into the annular space between said first and second strips of flexible material; and
   e. small protruding means projecting radially inwardly from the inner surface of said forming cylinder adjacent said other end thereof.

16. Apparatus for making a continuous length of tubing with walls formed of foamed material, said apparatus comprising:
   a. a forming cylinder having mandrel means extending centrally thereof along the length of said cylinder, said mandrel means being hollow and having its extended end closed and its other end open, and a tube extending into said mandrel through said open end thereof with its extending end being open adjacent said closed end of said mandrel, and means for causing a cooling fluid to flow through said tube and out through said open end of said tube, whereby said cooling fluid is introduced into said mandrel adjacent said closed end thereof, flows along the length of said mandrel, and is discharged from said open end of said mandrel;
   b. first means for feeding a first strip of flexible material into one end of and through said forming cylinder, and forming said first strip of material into a cylindrical shape about said mandrel;
   c. second means for feeding a second strip of flexible material into said one end of and through said forming cylinder, and forming said first strip of material into a cylindrical shape at the interior surface of said forming cylinder;
   d. means for injecting a curable foaming plastic mixture into said one end of said forming cylinder and into the annular space between said first and second strips of flexible material;
   e. control means comprising:
      i. first sensor means disposed adjacent said one end of said forming cylinder for sensing the point along the length of said forming cylinder at which said foaming plastic material begins to cure into a solid, and regulating means for responsive to said sensing means for proportionally increasing the speed at which said strips of flexible material are fed through said forming cylinder when said sensed point of curing is within a predetermined distance from said one end of said forming cylinder and for proportionally decreasing said speed when said sensed point of curing is beyond a predetermined distance from said one of said forming cylinder;
      ii. second sensor means for detecting a break in either of said strips of flexible material, and means for stopping the further feeding of said strips of flexible material and for stopping the further injection of said plastic mexture when said break is detected; and
      iii. third sensor means for monitoring the supply of said first and second strips of flexible material being fed to said forming cylinder, and means for stopping the further feeding of said strips to flexible material and for stopping the further injection of said plastic mixture when said supply of flexible material reaches a predetermined minimum amount; and
   f. at least one small protruding element projecting radially inwardly from the inner surface of said forming cylinder at the other end thereof.

17. A method of making a continuous length of tubing with walls formed of foamed material, said method comprising the steps of:
   a. providing a forming cylinder having mandrel means extending centrally thereof along the length of said cylinder;
   b. feeding a first strip of flexible material into one end of and through said forming cylinder and forming said first strip of material into a cylindrical shape about said mandrel;
   c. feeding a second strip of flexible material into said one end of and through said forming cylinder, and forming said second strip of material into a cylindrical shape at the interior surface of said forming cylinder;
   d. injecting a curable foaming plastic mixture into said one end of said forming cylinder and into the annular space between said first and second strips of flexible material to cause said mixture to become cured into a solid as it moves along said forming cylinder; and e. sensing the point along the length of said forming cylinder at which said foaming plastic mixture begins to cure into a solid, and selectively varying the speed at which said first and second strips of material are fed through said forming cylinder as a function of said point at which said plastic mixture begins to cure.

18. A method for making a continuous length of tubing as defined in claim 17 and further comprised in that said speed at which said strips are fed is increased when said sensed point of curing is within a predetermined distance from said one end of said forming cylinder, and in that said speed is decreased when said sensed point of curing is beyond said predetermined distance from said one end of said forming cylinder.

19. A method for making a continuous length of tubing as defined in claim 17 and further comprised by the step of monitoring said strips of flexible material to detect a break in either of said strips of flexible material, and stopping the further feeding of said strips of flexible material and stopping the further injection of said plastic mixture when a break is detected.

20. A method for making a continuous length of tubing as defined in claim 17 and further comprised by the step of monitoring the supply of said strips of flexible material being fed to said forming cylinder, and stopping the further feeding of said strips of flexible material and stopping the further injection of said plastic mixture when said supply reaches a predetermined minimum quantity.

21. A method for making a continuous length of tubing as defined in claim 17 and further comprised in that said mandrel is hollow, and by the step of causing a cooling fluid to flow within said mandrel in a direction from the extending end of said mandrel toward the end of said mandrel adjacent said one end of forming cylinder.

22. A method for making a continuous length of tubing as defined in claim 17 and further comprised by the step of providing at least one protrusion at the interior surface of the other end of said forming cylinder to score said second strip of flexible material as it passes through said other end of said forming cylinder.

23. Apparatus for making a continuous length of tubing with walls formed of foamed material, said apparatus comprising:

a. a rigid forming cylinder having mandrel means extending centrally along the length thereof;

b. a first strip of flexible material extending into one end of and through said forming cylinder, said first strip of flexible material being formed into a cylindrical shape about the exterior surface of said mandrel;

c. a second strip of flexible material extending into said one end of and through said forming cylinder, said second strip of flexible material being formed into a cylindrical shape about the exterior surface of said mandrel;

d. means for injecting a curable foaming plastic mixture into said one end of said forming cylinder and into the annular space between said first and second strips of flexible material; and e. means disposed beyond the other end of said forming cylinder for pulling said first and second strips of flexible material through said forming cylinder at a predetermined speed that results in said plastic mixture becoming substantially fully cured during its passage along the length of said forming cylinder.

* * * * *